April 29, 1958     D. M. WADE     2,832,450
ONE-WAY CLUTCHES
Filed Dec. 23, 1955     2 Sheets-Sheet 1
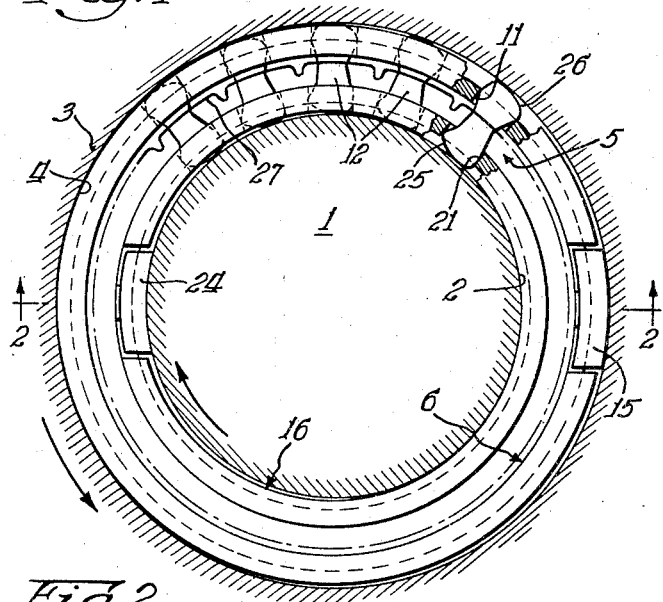
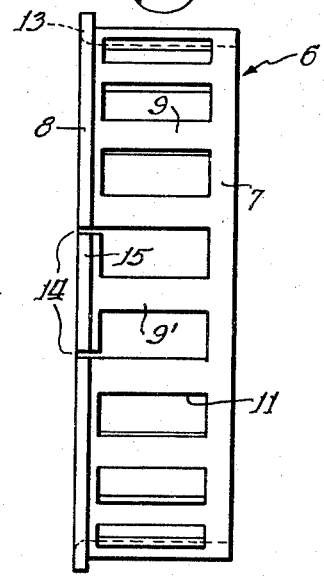
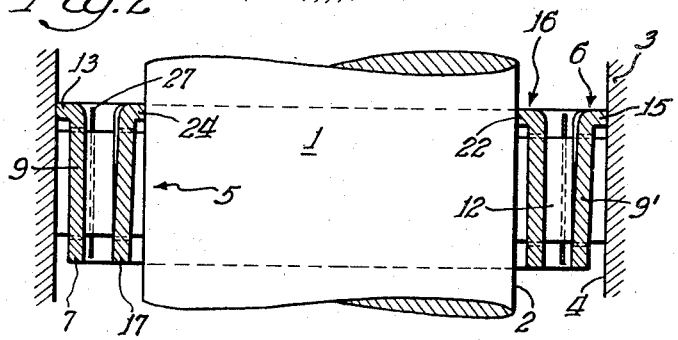
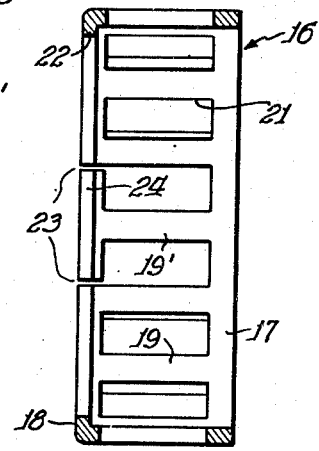
Inventor:
Daniel M. Wade
By:
Donald W. Banner Atty.

April 29, 1958     D. M. WADE     2,832,450
ONE-WAY CLUTCHES

Filed Dec. 23, 1955     2 Sheets-Sheet 2

Inventor:
Daniel M. Wade
By: Donald W. Banner Atty.

United States Patent Office 2,832,450
Patented Apr. 29, 1958

2,832,450

ONE-WAY CLUTCHES

Daniel M. Wade, River Forest, Ill., assignor to Borg-Warner Corporation, a corporation of Illinois Application December 23, 1955, Serial No. 555,104

14 Claims. (Cl. 192—45.1)

This invention relates generally to a one-way engaging device, and more particularly to tiltable gripper type device connecting relatively rotatable races in one relative direction of rotation, which incorporates a cage means constructed and arranged to minimize free-wheel wear on the grippers during the overrunning condition of the device.

In the past many attempts have been made to construct a one-way engaging device of the tiltable gripper type in such a way as to minimize the wear on the tiltable grippers during the overrunning condition of the device. Each of these prior attempts to solve this problem, has, to the best of my knowledge, been subject to many undesirable characteristics. In some of these prior attempts, the clutch comprised one or more cages for receiving the tiltable grippers, the cage being ovalized to engage and effect a drag upon the race surfaces. It has been found that with such construction the spring rate of the cage is excessive, and therefore even a minor degree of wear on the cage reduces the drag to such a degree that it becomes completely ineffective for the purpose intended. If the cage of this type is constructed so as to be flexible and have a low spring rate, the sprags or tiltable grippers received by the cage are permitted to move circumferentially relative to the cage when the clutch is shock loaded so that erratic clutch operation or clutch failures result. Furthermore, with such ovalized cage, the spring rate is relatively hard to vary, and the ovalized cages were frequently constructed in such a way as to drag on the same portions of the race surfaces that the sprags or tiltable grippers engaged, to the end that the race surfaces engaged by the sprags tend to become grooved, scored and rough causing undue wear on the grippers.

Other attempts to solve this problem have comprised providing cages with openings for receiving tiltable grippers or sprags, some of the cross bars between the openings being severed intermediate their ends and arranged to engage the associated race surfaces, such cross bars frequently being provided with separate insert members which engaged the race. Clutches of this type were subject to the disadvantage that the cross bar through which the cut was made would have to be provided with a race engaging surface—or an insert—which was curved to complementarily engage the race surface. This manifestly was required so that the race surfaces would not be scored, and it is equally obvious that provision of such construction was unduly expensive. Furthermore, with such an arrangement, the portion of the races engaged by the cut cross bar (or the insert which it carried) would be the same portion upon which the sprags or tiltable grippers operated; as indicated above, this resulted in scoring of the race resulting in undue gripper wear. Clutches having cages with split cross bars of the type under discussion were subject to the further undesirable feature that the split cross bar would be—of necessity—circumferentially flexible to the end that the tiltable grippers when shock loaded could sometimes move circumferentially with respect to the main body of the cage against the relatively weak split cross bar, which resulted frequently in clutch failure.

Other prior art one-way engaging devices employed cages having openings therein for receiving sprags or tiltable grippers, the cross bars between the openings being continuous but also being deformed to engage the races. Devices of this type had all of the disadvantages discussed above in respect to the ovalized cages, and in addition also require the expense of curving the deformed cross bar so that it would not score the race.

The present invention has as its principal object the provision of an improved one-way engaging device which is so constructed as to minimize the sprag wear during free-wheeling, and which substantially eliminates the difficulties found in prior devices.

Another object is the provision of an improved device in accordance with the preceding object which is inexpensive to manufacture, but which has a substantially increased life.

Another object is the provision of an improved device in accordance with the preceding objects in which the spring rate of the element employed to drag on the races is readily varied to meet the requirements of various clutch models.

Another object is the provision of an improved device in accordance with the preceding objects in which cage means enclosing the sprags are provided, the circumferential dimension of the openings which receive the tiltable grippers or sprags remaining virtually constant.

Another object is the provision of an improved device in accordance with the preceding object in which the cage means comprise a pair of cages provided with generally uninterrupted axially facing end portions and having generally circular radial configuration, at least one of the end portions being constructed to form a T-shaped segment supported from the opposite end portion by a cross bar and constructed to frictionally engage the adjacent race surface.

Another object of the present invention is the provision of an improved device in accordance with the preceding object in which the T-shaped segment engages the adjacent race surface at a position which is adjacent to and spaced slightly from that portion of the race surface engaged by the sprags.

Another object of the present invention is the provision of an improved device in accordance with the preceding object in which a pair of radially spaced and relatively rotatable cages are provided, the cages having a plurality of spaced apertures therein separated by cross bars through which tiltable grippers respectively extend, the grippers and apertures being constructed such that the circumferentially facing sides of the grippers remain in engagement with the circumferentially facing sides of the apertures throughout the normal tilting range of the grippers with only bearing clearance therebetween, at least one of the cages having generally uninterrupted axially facing end portions of substantially circular configurations, one of the end portions being constructed to form a T-shaped segment supported from the opposite end portion by a cross bar and constructed to frictionally engage the adjacent race surface along a portion spaced from that portion of said race surface engaged by the tiltable grippers.

Other objects and features of the invention will be readily apparent to those skilled in the art from the specification and appended drawing illustrating certain preferred embodiments in which:

Figure 1 is a partial end elevational view of a one-way engaging device in accordance with the present invention showing the device in assembled position between inner and outer races;

Figure 2 is a sectional view along the plane of line 2—2 of Figure 1;

Figure 3 is an enlarged view of the outer cage illustrated in Figure 1;

Figure 4 is a view of the inner cage illustrated in Figure 1;

Figure 11:
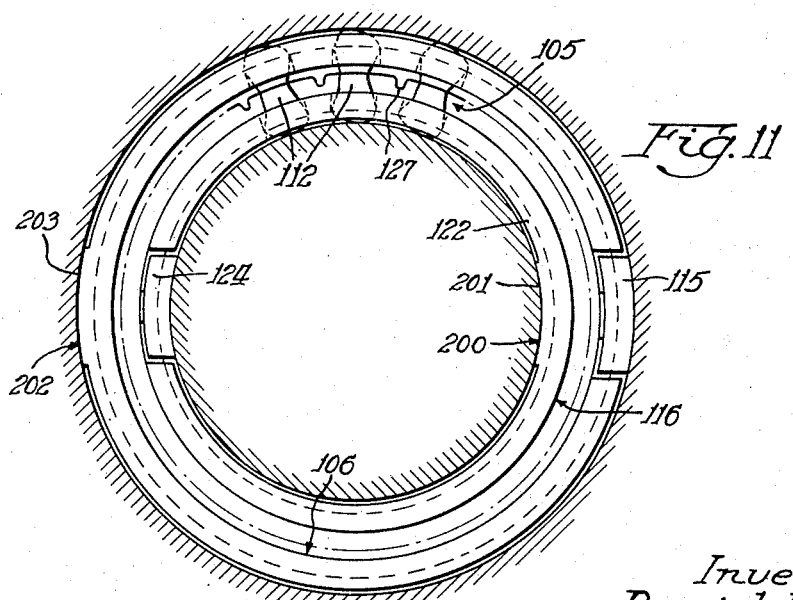

Figures 5 through 10 respectively illustrate various modifications of the device illustrated in Figure 1;

Figure 11 is a view similar to Figure 1 illustrating a further modification of the present invention.

Considering first the modification of the present invention illustrated in Figures 1 through 4, there is disclosed therein an inner race 1 having a cylindrical outer surface 2, and an outer race 3 having an inner cylindrical surface 4. Disposed between the races 2 and 4 so as to couple the races upon their attempted relative rotation in one direction is a one-way engaging device 5 of the general type described and claimed in the copending application of Harry P. Troendly et al., Serial Number 379,534 and entitled "One-Way Clutch." This one-way engaging device comprises an outer generally rigid cage 6 of substantially cylindrical configuration. Cage 6 has along one axially facing side thereof a generally circular end member 7, and on the opposite side a generally circular end member 8. Extending between the members 7 and 8 are a plurality of spaced cross bars 9 which, with the end members, define a plurality of openings 11 in the cage 6 adapted to receive the upper end portions of tiltable sprags 12. The end member 8 of the cage 6 is provided with an upstanding flange 13, the outer periphery of which has a dimension which is slightly less than the diameter defined by the surface 4 of the race 3. As indicated best in Figure 3, the end member 8 is provided with openings 14, each of limited width, extending therethrough and communicating with a pair of adjacent openings 11. The openings 14 interrupt the continuity of the end member 8 to provide a segment 15 thereof which is disconnected from the adjacent portions of the end member 8 by virtue of the openings 14, and which is supported from the end member 7 by one of the cross bars 9, which, for convenience, has been indicated by the numeral 9'. The cross bar 9' is bent outwardly, as may be seen from an inspection of Figures 1 and 2, out of the circular plane in which the adjacent cross bars 9 lie, to effect engagement of the outer periphery of the segment 15 with the surface 4 of race 3.

In manufacturing the outer cage 6 the cage is originally formed without the openings 14, the outer periphery of the flange 13 being finished smooth, and all of the cross bars 9 being aligned in a common circular plane. The openings 14 (which are preferably very small in circumferential extent) are then cut into the end member 8, and the cross bar 9' then deflected to the degree desired to effect the predetermined degree of drag by the segment 15 on the associated race. If desired, the opposite ends of segment 15 may be tapered slightly inwardly to ensure against the sharp corners thereof "digging into" the associated race.

The one-way engaging device 5 further comprises an inner cage 16 of substantially cylindrical contour and over the main portion having an internal dimension slightly in excess of the diameter of the race surface 2. Cage 16 comprises a continuous circular end member 17 on one axially facing side and a generally circular end member 18 on the opposite side, the members 17 and 18 being connected together by a plurality of spaced cross bars 19. The members 17 and 18 and the cross bars 19 define a plurality of spaced openings 21 adapted to receive an internal portion of the sprags 12. The end member 18 is provided with an inwardly extending flange 22, normally slightly spaced from the surface to the race 1, and end member 18 is further provided with a pair of openings 23 of limited circumferential extent which communicate with a pair of adjacent openings 21. As best illustrated in Figure 4, the openings 23 and their cooperating openings 21 provide a segment 24 of end member 18 separated from the remaining portions of the end member 18 and connected to the opposite end member 17 by one of the cross bars 19, which for convenience has been indicated by the numeral 19'.

The cage 16 is fabricated in a manner similar to the one previously described with respect to cage 6, the inner surface of the flange 22 being finished smooth, the openings 23 then being cut through the end member 18, and the cross bar 19' then being deflected to effect the desired degree of engagement of the segment 24 with the surface 2 of the race 1 when the clutch 5 is in assembled position with the races. The ends of segment 24 are preferably slightly tapered outwardly, as previously described, to ensure against scoring of the race.

The sprags 12 respectively have an inner race engaging surface 25 and an outer race engaging surface 26 which are eccentrically curved so as to wedge between the races during attempted relative rotation thereof in one direction only. During opposite relative rotation of the races the sprags 12 are tilted to a position to permit such rotation. The sprags 12 and the openings 11 and 21 in the cages 6 and 16, respectively, are so constructed and arranged as to effect common axially tilting movement of all of the sprags 12, as described with more particularity in the aforementioned copending application. More particularly, the circumferentially facing sides of the sprags 12 and the circumferentially facing sides of the openings in the cages are constructed and arranged so that these sides on the sprags and cages remain in engagement—with only bearing clearance therebetween—throughout the normal tilting range of the sprags, to the end that tilting movement of any one sprag is transmitted through the cages 6 and 16 to all of the other sprags. As a result, all of the sprags will move angularly in unison and to the same degree, so that the load is not transferred to only a few sprags but is distributed throughout all of the sprags.

Disposed between the relatively rigid cages 6 and 16 is an intermediate, flexible, sheet metal cage 27 having a plurality of spaced openings therein through which the sprags 12 extend. The cage 27 openings are defined in part by a straight axially extending surface and a spring tab spaced from this surface and disposed in engagement with one side of the associated sprag 12 to force it against that straight surface and bias the sprag into engagement with the surfaces 2 and 4 (and in a generally clockwise direction in the view of Figure 1). This spring cage is more particularly described in the aforementioned copending application, and forms the subject matter of a separate patent application of Harry P. Troendly et al., Serial Number 263,064 and entitled, One-Way Engaging Device.

It should be noted that the spring cage 27, by biasing the sprags 12 as aforementioned, in effect biases the race engaging surfaces 25 and 26 of the sprags into engagement with the surfaces 2 and 4 of the races 1 and 3, respectively; as a result during the overrunning condition of the device—when the races rotate in the relative direction indicated by the arrows in Figure 1, the effect of the spring cage 27 is to cause a drag of the sprags on the races and excessive wear on the race engaging surfaces 25 and 26 of the sprags 12. With the device of the present invention, however, this wear is minimized. More specifically, assuming the race 1 to be fixed and the race 3 to be rotating in the direction illustrated by the arrow placed thereon in Figure 1, the one-way engaging device 5 would tend to move with the outer race both by virtue of the friction between the surface 4 of the outer race and the surfaces 26 of the sprags 12, and by virtue of the frictional engagement between the outermost surface of the segment 15 with the surface 4. It should be noted, however, that the innermost surface of the segment 24 on the inner cage 16 is in frictional engagement with the surface 2 of race 1. As a result, while the device 5 moves generally counterclockwise (in the view of Figure 1) segment 24 drags along the inner race surface 2 so that the inner cage 16 moves in a generally clockwise direction with respect to the outer cage 6. This relative movement between the cages effects a rotation of the sprags 12— counterclockwise as illustrated in Figure 1—to effectively "lift off" the surfaces 25 thereof from the race surface 2. As a result, the wear on these surfaces 25 is minimized, thereby prolonging significantly the life of the engaging device 5.

It will be seen from the foregoing explanation that the relative rotation between the cages 6 and 16, and the consequent tilting of the sprags 12, is effected by virtue of the frictional engagement between the segments 15 and 24 with their associated races. The degree of engagement between the outer cage "T-bar" (formed by the segment 15 and cross bar 9') and the outer race 3 is determined by the bias applied to segment 15 by cross bar 9'. Similarly the degree of frictional engagement between the inner cage "T-bar" (comprising the segment 24 and the cross bar 19') and the inner race is determined by the degree of bias applied by cross bar 19' to segment 24. It will be obvious that if the degree of drag provided by the segments 15 and 24 on their associated races is too small, the segments are ineffective for the purpose intended. Conversely, if the drag provided by these segments is too great, back-lash is introduced into the clutch which increases the impact of the sprags as the clutch moves from its overrunning to its engaged position which, of course, is extremely undesirable. It has been found, however, that when the cage drag is of the order of 1½ to 3 times the drag effected by the spring cage 27 the free-wheel wear in the sprags is markedly reduced, but no back-lash is introduced into the clutch. As a result, I prefer to provide a device in which the drag of at least one of the cages is of the order of 1½ to 3 times the drag effected by the sprag energizing springs, which in the illustrated embodiment is the spring cage 27. The drag of both of the cages may be the same, but I prefer to arrange the device such that the drag of one of the cages only is the controlling drag of the clutch so that the drag of the other cage is not critical, and the clutch may be manufactured more inexpensively. In addition, in some applications it has been determined that the life of the clutch is considerably lengthened if one of the cages is "fixed" to one of the races. This does not mean however, that one of the cages is rigidly fixed to the race; in distinction, the aforementioned economies and the increased life of the clutch under some circumstances may be accomplished by making the drag of one cage to be approximately two or three times the drag of the "controlled drag" cage. In summary, therefore, for some applications I prefer—as previously explained—to make the drag of the inner cage on the inner race (effected by the frictional engagement of segment 24 with the inner race) to be of the order of 1½ to 3 times the drag effected by the sprag energizing spring cage 27; in addition, I prefer the drag of the outer cage 6 on the outer race— effected by the frictional engagement of the segment 15 with the outer race—to be of the order of two to three times the drag of the inner cage 16.

Figure 5:
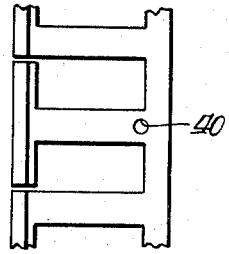
Figure 6:
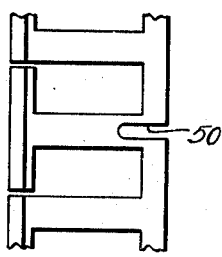
Figure 7:
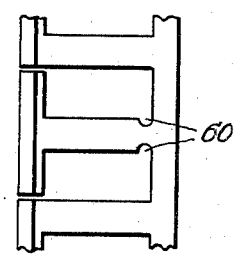
Figure 8:
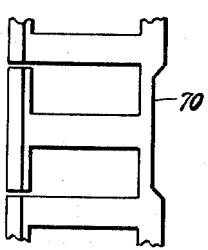
Figure 9:
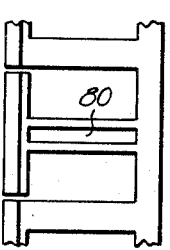
Figure 10:
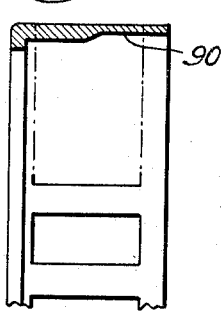

Considering now the modifications of the present invention illustrated in Figures 5 through 10, these modifications illustrate various means for varying the spring rate of the cross bar to which one of the race engaging segments is attached. In Figure 5, a hole 40 is punched through the end of the "T-bar" to make it more resilient. In Figure 6 a slot 50 is formed extending into the T-bar; in Figure 7, notches 60 are provided in the T-bars; in Figure 8, a notch 70 is cut into the circular end member to which the T-bar is attached; in the Figure 9 an elongated, rectangular aperture is formed into that cross bar which forms a part of the T-bar; and in Figure 10, the cross bar is reduced in thickness at 90 to vary the spring rate thereof.

Turning now to Figure 11, there is illustrated a one-way engaging device of the general type illustrated in Figure 1, the parts bearing the same numbers as in Figure 1 but for the addition of 100. In the modification of Figure 11, however, the inner cage 116 has provided integrally thereon, and in a position which is 180 degrees away from the segment 124, an inwardly directed, additional flange or "dog-tooth" 200 having an inwardly facing surface 201 which is curved so as to be complementary to the race surface 2. The "dog-tooth" 200, as illustrated in Figure 11, is an integral extension of flange 122. The surface 201 is finished smooth so as to engage the inner race 1 opposite the point of engagement of the segment 124 so that the total friction drag of the cage 116 on the race 1 may very accurately be predetermined. Similarly, the outer cage 106 is provided— at a point 180 degrees away from the segment 115—with a "dog-tooth" 202 having an outer surface 203 complementary to the race surface 4 and finished smooth; the provision of this "dog-tooth" 202 on the outer cage results, as previously described, in determining with great accuracy the total degree of frictional drag of the outer cage 106 on the outer race 3.

It should be understood that a plurality of "T-bars" may be provided on any cage as desired; also, a plurality of "dog-tooth" or an entire absence thereof may be desired; further, in some applications it has been desirable to use a "dog-tooth" on one cage but none on the other.

It should be noted from the foregoing description and the drawings that the device of the present invention provides novel and signally improved means for transferring the sprag wear to less critical surfaces. It should be noted that the degree of magnitude of the cage drag on the races is readily varied so that for any particular clutch application the desired drag magnitude may be incorporated into the clutch with a minimum of effort. In addition, the relatively low spring rate provided by the T-bars of the present invention makes the device substantially insensitive to wear so as to prolong the clutch life. Furthermore, it should be noted there is absolutely no rubbing upon, or polishing of, that portion of the races— due to the T-bars—which is engaged by the sprags. In addition, in view of the fact that the openings 14 and 23 are of very limited circumferential extent, the circumferential extent of the spaced sprag-receiving openings in communication with these openings 14 and 23 is not permitted to change to any degree; in other words, should the cross bar 9' or the cross bar 19' be forced to bend in a circumferential direction by the sprags in the openings 11 or 21 adjacent the T-bar, the ends of the segments 15 and 24 will almost immediately engage the rigid, adjacent surfaces of the end member 8 or 18, as the case may be, so as to prohibit anything but a very minor movement of the cross bars 9' or 19'. As a result, the aforementioned cooperation between the circumferentially facing sides of the sprags and openings is maintained to a great degree. It is further very important to note that the device of the present invention while providing all of the advantages indicated, and while being free from the disadvantages aforementioned, may be manufactured at very low cost, and without the necessity for any special tooling.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

I claim:

1. A one-way engaging device adapted to operate between a pair of races comprising a plurality of tiltable grippers adapted to be mounted between the races, a pair of relatively rotatable cage means adapted to be mounted between the races having first and second end portion means and a plurality of cross bar means extending therebetween defining spaced apertures in said cage means through which the ends of said grippers extend, said cage means including a plurality of opening defining means extending through said first end portion means and communicating with certain of said spaced apertures to define therewith a generally T-shaped cage section including a part of said first end portion and cross bar means connected to said second end portion means, said part being adapted to engage the associated race.

2. A one-way engaging device adapted to operate between a pair of races comprising a plurality of tiltable grippers adapted to be mounted between the races, a pair of relatively rotatable cage means adapted to be mounted between the races having first and second end portion means and a plurality of cross bar means extending therebetween defining spaced apertures in said cage means through which the ends of said grippers extend, said cage means including opening defining means extending through said first end portion means defining an end portion part separated from the remainder of said first end portion means, said end portion part being connected to said second end portion means by certain of said cross bar means, said certain cross bar means being constructed and arranged to yieldably position said end portion part in position to engage the adjacent race surface.

3. A one-way engaging device adapted to operate between a pair of races comprising a plurality of tiltable grippers adapted to be mounted between the races, a pair of relatively rotatable cage means adapted to be mounted between the races having first and second end portion means and a plurality of cross bar means extending therebetween defining spaced apertures in said cage means through which the ends of said grippers extend, said cage means including an end portion part supported solely by certain of said cross bar means, said certain cross bar means being constructed and arranged to yieldably position said part out of alignment with the contiguous sections of the adjacent end portion.

4. A one-way engaging device adapted to operate between a pair of races comprising a plurality of tiltable grippers adapted to be mounted between the races, a pair of relatively rotatable cage means adapted to be mounted between the races having first and second end portion means and a plurality of cross bar means extending therebetween defining spaced apertures in said cage means through which the ends of said grippers extend, said apertures and tiltable grippers being constructed and arranged to effect constant engagement between the circumferentially facing sides of said grippers and the circumferentially facing sides of said openings with only bearing clearance therebetween throughout the operating tilting range of said grippers, said cage means including a pair of opening defining means extending through said first end portion means and communicating with certain of said spaced apertures to define therewith a generally T-shaped cage section including a part of said first end portion and cross bar means connected to said second end portion means, said part being adapted to engage the associated race.

5. A one-way engaging device adapted to operate between a pair of races comprising a plurality of tiltable grippers adapted to be mounted between the races, a pair of relatively rotatable cage means adapted to be mounted between the races having first and second end portion means and a plurality of cross bar means extending therebetween defining spaced apertures in said cage means through which the ends of said grippers extend, said end portion means including flange means having a finished smooth surface adapted to face the race adjacent said flanged cage means, and means defining a pair of openings extending through said flange means and communicating with certain of said spaced apertures to define therewith a generally T-shaped cage section including a portion of said flange means and cross bar means, said portion of said flange means being adapted to engage the associated race.

6. A one-way engaging device adapted to operate between a pair of races comprising a plurality of tiltable grippers adapted to be mounted between the races, a pair of relatively rotatable cage means adapted to be mounted between the races having first and second end portion means and a plurality of cross bar means extending therebetween defining spaced apertures in said cage means through which the ends of said grippers extend, said apertures and tiltable grippers being constructed and arranged to effect constant engagement between the circumferentially facing sides of said grippers and the circumferentially facing sides of said openings with only bearing clearance therebetween throughout the operating tilting range of said grippers, said end portion means including flange means having a finished smooth surface adapted to face the race engaging said flanged cage means, and means defining a pair of openings extending through said flange means and communicating with certain of said spaced apertures to define therewith a generally T-shaped cage section including a portion of said flange means and cross bar means, said portion of said flange means being adapted to engage the associated race.

7. A one-way engaging device adapted to operate between a pair of races comprising a plurality of tiltable grippers adapted to be mounted between the races, a pair of relatively rotatable cage means adapted to be mounted between the races having first and second end portion means and a plurality of cross bar means extending therebetween defining spaced apertures in said cage means through which the ends of said grippers extend, each of said cage means comprising a plurality of openings defining means extending through said first end portion means and communicating with certain of said spaced apertures to define therewith a generally T-shaped cage section including a part of said first end portion and cross bar means adapted to connect to said second end portion means, each part being adapted to engage the associated race.

8. A one-way engaging device adapted to operate between a pair of races comprising a plurality of tiltable grippers adapted to be mounted between the races, a pair of relatively rigid and relatively rotatable cage means adapted to be mounted between the races having first and second end portion means and a plurality of cross bar means extending therebetween defining spaced apertures in said cage means through which the ends of said grippers extend, spring means adapted to bias said tiltable grippers into engagement with said races, said cage means including a plurality of opening defining means extending through said first end portion means and communicating with certain of said spaced apertures to define therewith a generally T-shaped cage section including a part of said first end portion and cross bar means connected to said second end portion means, said part being adapted to engage the associated race, said certain cross bar means being constructed and arranged to yieldably position said part in engagement with the associated race surface with a biasing force adapted to effect a drag of said part on the associated race which is of the order of 1½ to 3 times the drag effected by said spring.

9. The device defined in claim 8 in which each of said relatively rigid rotatable cage means is provided with said opening defining means which define a generally T-shaped cage section.

10. The device defined in claim 8 in which said apertures and tiltable grippers are constructed and arranged to effect constant engagement between the circumferentially facing sides of said grippers and the circumferentially facing sides of said openings with only bearing clearance therebetween throughout the operating tilting range of said grippers.

11. A one-way engaging device adapted to operate between a pair of races comprising a plurality of tiltable grippers adapted to be mounted between the races, a pair of relatively rigid and relatively rotatable cage means adapted to be mounted between the races having first and second end portion means and a plurality of cross bar means extending therebetween defining spaced apertures in said cage means through which the ends of said grippers extend, spring means adapted to bias said tiltable grippers into engagement with said races, each of said cage means including means defining a generally T-shaped cage section including a part of said first end portion means and certain cross bar means connected to said second end portion means, said certain cross bar means on one of said cage means being constructed and arranged to effect a drag by said one cage means on the associated race of the order of 1½ to 3 times the drag effected by said spring, said certain cross bar means on the other of said cage means being constructed and arranged to effect a drag of said other cage means on the associated race which is of the order of 2 to 3 times the drag effected by said one cage means.

12. The device defined in claim 11 in which said apertures and tiltable grippers are constructed and arranged to effect constant engagement between the circumferentially facing ends of said grippers and the circumferentially facing sides of said openings with only bearing clearance therebetween throughout the operating tilting range of said grippers.

13. A one-way engaging device adapted to operate between a pair of races comprising a plurality of tiltable grippers adapted to be mounted between the races and wedge therebetween upon attempted relative rotation of the races in one direction, cage means through which said grippers extend adapted to be mounted between the races having first and second end portion means and a plurality of cross bar means extending therebetween defining spaced gripper receiving apertures, said cage means comprising a generally T-shaped cage section adapted to frictionally engage one of the races formed of a part of said first end portion means and certain of said cross bar means connected to said second end portion.

14. The device defined in claim 13 further characterized by the inclusion of spring means adapted to bias said grippers into engagement with the races, and in which the frictional engagement of said T-shaped cage section with one of the races effects a drag of said cage means on the one race which is of the order of 1½ to 3 times the drag effected by said spring.

References Cited in the file of this patent

UNITED STATES PATENTS 2,404,221    Dodge _____ July 16, 1946